(12) United States Patent
Baggen et al.

(10) Patent No.: US 10,062,178 B2
(45) Date of Patent: Aug. 28, 2018

(54) LOCATING A PORTABLE DEVICE BASED ON CODED LIGHT

(71) Applicant: PHILIPS LIGHTING HOLDING B.V., Eindhoven (NL)

(72) Inventors: Constant Paul Marie Jozef Baggen, Blerick (NL); Peter Hoekstra, Waalre (NL); Benjamin Johannes Vos, Eindhoven (NL); Bas Van Tiel, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 21 days.

(21) Appl. No.: 15/300,128

(22) PCT Filed: Mar. 19, 2015

(86) PCT No.: PCT/EP2015/055779
§ 371 (c)(1),
(2) Date: Sep. 28, 2016

(87) PCT Pub. No.: WO2015/144553
PCT Pub. Date: Oct. 1, 2015

(65) Prior Publication Data
US 2017/0178360 A1    Jun. 22, 2017

(30) Foreign Application Priority Data
Mar. 28, 2014 (EP) .................................... 14162494

(51) Int. Cl.
*G06T 7/73* (2017.01)
*G06F 1/16* (2006.01)
*H04M 1/02* (2006.01)

(52) U.S. Cl.
CPC .............. *G06T 7/74* (2017.01); *G06F 1/1686* (2013.01); *G06F 1/1694* (2013.01); *G06T 2207/30244* (2013.01); *H04M 1/0202* (2013.01)

(58) Field of Classification Search
CPC .......... H04M 1/0202; G06T 7/74; G06T 1/16; G06T 2207/30244
See application file for complete search history.

(56) References Cited

U.S. PATENT DOCUMENTS

| | | | |
|---|---|---|---|
| 8,994,799 B2 * | 3/2015 | Ganick | ..................... G01S 1/70 348/61 |
| 2012/0203453 A1 | 8/2012 | Lundquist et al. | |
| 2014/0084050 A1 | 3/2014 | Calvarese et al. | |

* cited by examiner

*Primary Examiner* — Qian Yang
(74) *Attorney, Agent, or Firm* — Meenakshy Chakravorty

(57) ABSTRACT

The invention relates to an apparatus, a system and a method of locating a location of a portable device using coded light, the portable device comprising an image sensor and an inertial measurement unit, the method comprising: obtaining a first image comprising the coded light source from the image sensor and substantially simultaneously obtaining orientation information indicative of the orientation of the portable device or the image sensor from the inertial measurement unit; obtaining light source specific information in the form of: an identifier that allows retrieval of a three-dimensional location of the coded light source or a three-dimensional location of the coded light source; and computing the location of the portable device or image sensor based on the orientation information, a predetermined height estimate of the portable device or image sensor and the light source specific information.

15 Claims, 8 Drawing Sheets

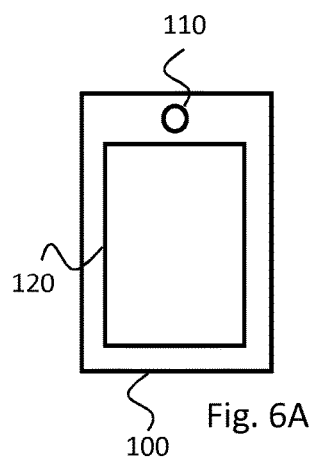
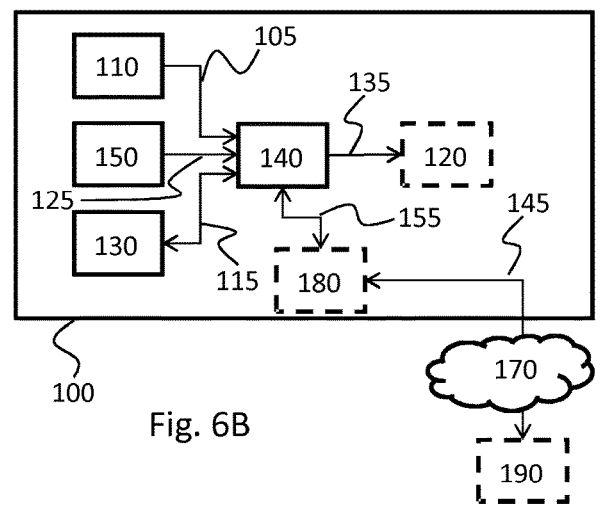
Fig. 6A
Fig. 6B
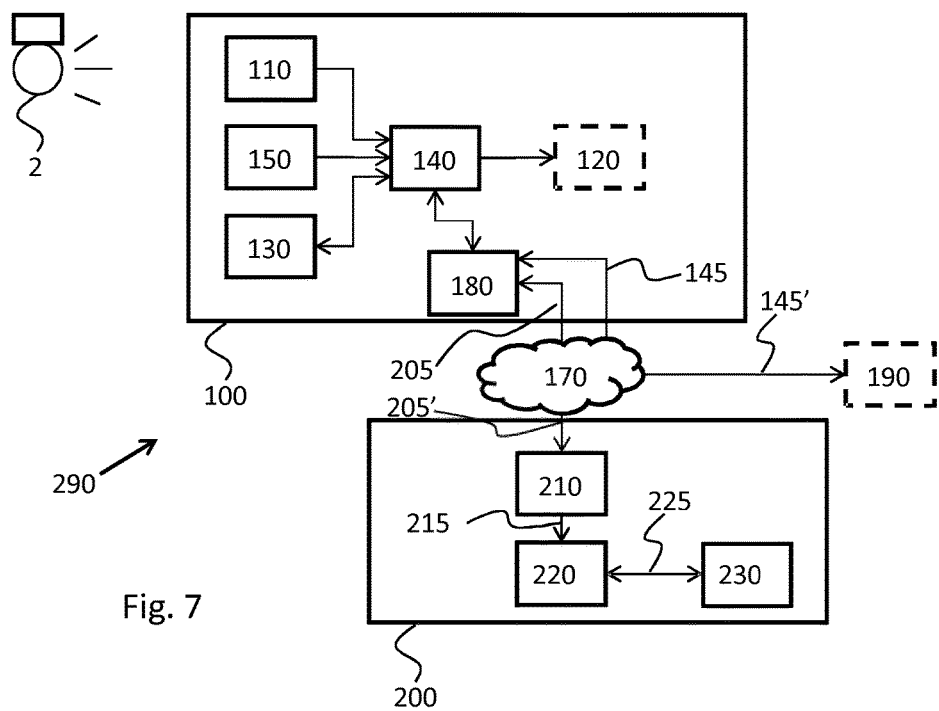
Fig. 7

LOCATING A PORTABLE DEVICE BASED ON CODED LIGHT

CROSS-REFERENCE TO PRIOR APPLICATIONS

This application is the U.S. National Phase application under 35 U.S.C. § 371 of International Application No. PCT/EP2015/055779, filed on Mar. 19, 2015, which claims the benefit of European Patent Application No. 14162494.0, filed on Mar. 28, 2014. These applications are hereby incorporated by reference herein.

FIELD OF THE INVENTION

The present invention relates generally to the field of location systems, and more particularly to a method, apparatus and system for localization based on coded light.

BACKGROUND OF THE INVENTION

Location systems have become mainstream devices in the last two decades, first with the introduction of low-cost GPS devices and later on with the almost worldwide adoption of smart phones having navigation functionality.

More recently indoor location systems are receiving increased attention. Several indoor location systems are known, systems based on, infrared (IR), ultrasound, video surveillance, and RF signals.

Also multi-modal systems appear to attract quite some attention, such as the "Headio" system, as presented in "Headio: Zero-Configured Heading Acquisition for Indoor Mobile Devices Through Multimodal Context Sensing", by Zheng Sun, et al. The latter system combines information from gravity sensors and magnetometer sensors as found in a smart phone with camera data captured therewith. In the Headio system the front facing camera is used to image the ceiling, a ceiling which quite often has straight edges which can be used as a further modality for orientation.

However, not all ceilings have such "clearly visible edges", and in situations where these are lacking the system may not perform well.

SUMMARY OF THE INVENTION

The present invention moves away from the locating systems that use RF localization as the primary means for establishing a portable device location. Instead the present invention focuses on using light sources which are widely available. More particularly the present invention proposes to utilize light sources that have registered three-dimensional locations as the primary means for localization. Advantageously the light sources in question are coded light sources. Coded light here refers to modulations on visible light used primarily for illumination purposes. By properly modulating the light the modulation can remain substantially invisible to the naked eye, yet can provide information to portable devices arranged with a suitable coded light receiver.

In accordance with a first aspect of the invention a method of locating a location of a portable device is provided using a first light source, the portable device comprising an image sensor and an inertial measurement unit, the method comprising: obtaining a first image comprising a first light source from the image sensor and substantially simultaneously obtaining orientation information indicative of the orientation of the portable device or the image sensor from the inertial measurement unit; establishing a three-dimensional location of the first light source; and computing the location of the portable device or image sensor based on the orientation information, the position of the first light source in the first image, a predetermined height estimate of the portable device or image sensor and the three-dimensional location of the first light source.

Notably the inertial measurement unit (IMU) provides the orientation of either the portable device or of the image sensor, in case the IMU provides the orientation of the portable device, this may be used to determine the orientation of the image sensor. The image sensor in turn provides a first image of the field of view of the image sensor. When a light source is visible within this field of view, it will be imaged by the image sensor; thereby registering information of the relative position of the image sensor with respect to the light source.

Next we need to establish the three-dimensional location of the first light source. In one embodiment this may be accomplished by having a user indicate which specific light is being imaged on a map and subsequently retrieving its three-dimensional location from a database.

In a particularly advantageous embodiment, the light source itself can provide this information either directly or indirectly. Direct provision of the three-dimensional location information is possible when the light source transmits it three-dimensional location in the coded light signal. Indirect provision of three-dimensional location information is possible when the light source provides light source specific information in the coded light signal that allows retrieval of the three-dimensional location information from a database.

Once the three-dimensional location information is available the information may be used to provide an estimate of the location of the portable device. In order to do so we further assume that the portable device is located at a predetermined height, this height may be set to a predetermined height value, may be customized for the primary user of the device, and/or may even be corrected over time as will be discussed herein below.

Using the collected data and the predetermined height estimate, we can compute a location relative to the coded light source and based on the known location of the light source thereby estimate the location of the portable device.

In a further preferred embodiment, the coded light source provides light source specific information that enables retrieval of the coded light source three-dimensional location. Notably this may simplify the commissioning process of the coded light source, as the light source need not be programmed with its exact position, but effectively only needs to transmit a (locally) unique identifier that allows retrieval of the location from a data base.

In a preferred embodiment, the orientation information is based on multiple input modalities, wherein the contribution of the respective input modalities is weighted based on one or more control criteria. A first input modality is magnetic compass data, this is useful information at startup when there is no motion, however it is less reliable than accelerometer and/or gyroscope data when a substantial distance is covered. A second input modality can be three-dimensional accelerometer data. Accelerometer data is typically used as it is more reliable than the compass data and gyroscope data. A further modality is the three-dimensional gyroscope data. Gyroscope data can be used when there is substantial movement of the portable device, however, gyroscope data is initially unreliable and tends to drift when there is little motion. More preferably use of the respective data is based on criteria in the form of a reliability measure of the respective modality.

In a preferred embodiment the portable device may, once it has established its position relative to a coded light source, also use other light sources, more particularly non-coded light sources for localization. To this end the method further comprises obtaining heading information indicative of the orientation of the portable device in the horizontal plane, obtaining a second image comprising a second light source. Notably the second light source may, but need not, transmit coded light. In the event that the second light source emits coded light it may be possible to use that information as described hereinbefore to determine the device location. By combining the newly calculated location with the previous calculated location a more accurate location can be obtained.

In the event that the second light source does not emit coded light it may still be possible to use the detection of that light source in combination with the previously calculated location and the information from the IMU to compute a reliable location update. To this end the earlier described method may be extended by, accessing second map information comprising three dimensional location data, providing further three-dimensional locations of light sources, establishing a candidate light source comprised in the second map information based on a computed location of the portable device or image sensor, the position of the second light source in the second image, and the heading information, and computing an updated location of the portable device or image sensor under the assumption that the light source in the second image corresponds with the candidate light source, using: the orientation information, the position of the second light source in the second image, the location of the candidate light source in the second image, the predetermined height estimate of the portable device or image sensor, and the location of the candidate light source identified by the second map information. As in this approach both coded light sources and non-coded light sources can be used this approach enables localization using coded light at a reduced cost for existing locations, as only some of the light sources need to be replaced by coded-light light sources.

In a preferred embodiment the method of localization consolidates the location and orientation using a particle filter, and wherein multiple particles are maintained each particle reflecting a different possible state of the portable device, each state comprising a possible orientation and a possible location of the portable device and wherein the method involves: for each particle determining a weight for the particle by matching the orientation and location of the respective particle with the obtained orientation information and the computed location, wherein the weight is higher when the match is better; resampling the particles, by generating new particles based on the weights, wherein a larger number of new particles are chosen in proximity of particles with a higher weight, and computing a consolidated location and orientation of the portable device or image sensor by averaging over the weighted particles, or over the resampled particles. More optionally the averaging may be limited to a subset of the highest weight particles, or may even entail selecting the highest weight particle. By maintaining and tracking multiple particles it is possible to take into account uncertainty within the determined estimate of the location and orientation.

In a preferred embodiment the method of localization consolidates the location and orientation using a multiple hypothesis tracking, wherein multiple hypotheses are maintained each hypothesis reflecting a different possible state of the portable device, each state comprising a possible orientation and a possible location of the portable device and wherein the method involves: for each hypothesis determining a metric for a hypothesis by matching the orientation and location of the respective hypothesis with the obtained orientation information and the computed location, wherein the metric is lower when the match is better; branching each hypothesis into likely descendants, computing the metric for each descendant and retaining a pre-determined number of survivors for the next iteration; and computing a consolidated location of the portable device or image sensor by picking the best hypothesis based on the respective metric. By maintaining and tracking multiple hypotheses it is possible to take into account uncertainty within the determined estimate of the location and orientation.

In a preferred embodiment of the first aspect the method further comprises detecting multiple light sources in a third image from the image sensor, wherein the multiple light sources are comprised in the first or second map information, computing candidate locations of the portable device or image sensor based on the respective locations of the multiple light sources and correcting at least one of: the predetermined height estimate and/or the orientation information. In this manner reliable location information determined using the image sensor may be used for correction of e.g. compass deviation and/or gyroscope drift.

In a further embodiment the light source specific information comprises a three dimensional location of the first light source, and wherein the computing comprises: computing one or more candidate locations of the portable device based on: the orientation information, the position of the first light source in the first image, a predetermined height estimate of the portable device or image sensor, and the three-dimensional location of the first light source comprised in the light source specific information. By providing the three-dimensional location of the coded light source directly a portable device having a map of a building may navigate within the building without the need for a back-channel for retrieving the location information.

Once the location of the device is known; the location of the device can be communicated to the user of the device. In addition it should be noted that when in use, the location of the device will generally substantially coincide with the location of the device user. Advantageously embodiments of the present invention may further comprise presenting a visual indicator corresponding with the computed location of the portable device or image sensor by presenting a two-dimensional map of the vicinity of the portable device on a display of the portable device, and providing a visual indicator corresponding with the computed location.

Preferably the orientation of the map presented to the user is rotated such that if the display is substantially horizontal and the calculated orientation of the portable device or image sensor is correct then the orientation of the map on the display aligns with that of the physical world.

Preferably the visualization further comprises presenting one or more visual indicators corresponding to one or more light sources.

Preferably the coded light sources are indicated using visual indicators distinct from the visual indications representing light sources that do not emit coded light.

Preferably the visualization comprises a distinctive visual indicator for the one or more light source used for computing the location of the portable device or image sensor.

Preferably the visualization comprises a visual indicator of the reliability of the location of the portable device or image sensor that is provided on the display.

In accordance with a second aspect of the present invention a computer program product is provided, that is downloadable from a communication network and/or stored on a computer-readable and/or microprocessor-executable medium, characterized in that it comprises program code instructions for implementing a method as described herein above.

Here computer-readable and/or processor-executable media are considered to comprise at least, non-volatile storage devices, such as solid state memory devices, optical disc, hard discs and other computer readable storage media known to those skilled in the art.

In accordance with a third aspect of the present invention a portable device is provided the device arranged for locating its location using a first light source, the portable device comprising: an image sensor, an inertial measurement unit, and a first processing unit, the first processing unit arranged to: obtain a first image from the image sensor, obtain orientation information from the inertial measurement unit substantially simultaneously with the first image from the image sensor; establish a three-dimensional location of the first light source, when the first image comprises the first light source; and compute the location of the portable device or image sensor based on the orientation information, the position of the first light source in the first image, a predetermined height estimate of the portable device or image sensor and the three-dimensional location of the first light source.

A device according to the third aspect may be used for indoor navigation within a building. Moreover when the first light source is a coded light source, the first light source may provide its three-dimensional location information directly or indirectly. Notably when the three-dimensional location information is provided directly, or the portable device has local map information linking light source identifiers to positions, then coded light sources and non-coded light sources can be used for stand-alone indoor navigation using the plurality of light sources.

In the event the map information is stored remotely the portable device may further include a bi-directional wireless communication unit, such as a WiFi, GSM, 3G, LTE, 802.15.4, and/or a Zigbee unit for communicating map information comprising three-dimensional location data corresponding with the light sources.

In accordance with a fourth aspect of the invention a system is provided arranged for localization based on coded light, the system comprising: a plurality of light sources comprising the first light source, a portable device comprising: an image sensor, an inertial measurement unit, a wireless transceiver, and a first computing unit, a host device comprising: a wireless transceiver, and a second computing unit, the system arranged to: obtain a first image from the image sensor, obtain orientation information from the inertial measurement unit substantially simultaneously with the first image from the image sensor; establish a three-dimensional location of the first light source, when the first image comprises the first light source; and compute the location of the portable device or image sensor based on the orientation information, the position of the first light source in the first image, a predetermined height estimate of the portable device or image sensor and the three-dimensional location of the first light source.

In order to "bootstrap" the above system a user may e.g. link a detected light source with a light source map thereby linking the map to the imaged reality. More advantageously coded light may provide such linkage automatically.

The advantage of the above system over a standalone portable device implementation is that it enables the sharing of the relevant data detected by the mobile device with the host device using the wireless interface and further allows the host device to compute the location of the portable device and subsequently share that information with the portable device. This reduces the computational load for the portable device. Moreover when an indirection is used to access the three-dimensional light source location information, this moreover allows renewal of light source identifiers without the need for elaborate updating of distributed databases. In addition when coded light is used in a managed lighting environment it may be undesirable to share the information mapping all light sources in a building with third parties.

These and other aspects, features, and advantages of the invention will be apparent from and elucidated with reference to the embodiments described hereinafter. It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

FIG. 6A shows a front view of an example portable device;

FIG. 6B shows a block diagram of an example portable device;

FIG. 7 shows a block diagram of an example system;

FIGS. 8A-8D show example images as displayed on a portable device;

DETAILED DESCRIPTION

The present invention will now be described more fully hereinafter with reference to the accompanying drawings. The below embodiments are provided by way of example so as to convey the scope of the invention to those skilled in the art. Like numbers refer to like elements throughout.

Figure 1:
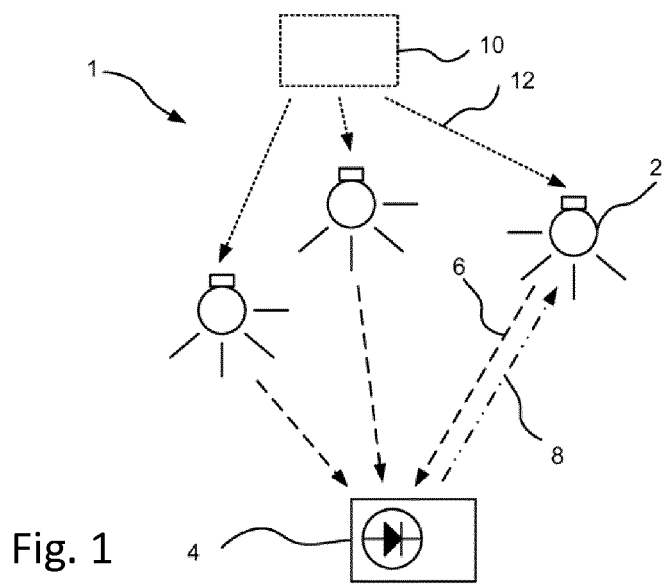
FIG. 1 illustrates a coded light lighting system.

Coded light systems as such are known. FIG. 1 illustrates a lighting system 1 comprising at least one light source, schematically denoted by the reference numeral 2. The at least one light source 2 may be a luminaire and/or be part of a lighting control system. Each light source 2 is capable of emitting coded light, as schematically illustrated by the arrow 6. Thus the lighting system 1 may be denoted as a coded light lighting system. A luminaire may comprise at least one light source 2. The term "light source" means a device that is used for providing light in a room, for purpose of illuminating objects in the room. A room is in this context typically an apartment room or an office room, a gym hall, a room in a public place or a part of an outdoor environment, such as a part of a street. Optionally there further is a return channel 8 from the receiver 4 to the light source 2, e.g. in the form of a Zigbee RF channel.

The light sources 2 are capable of emitting coded light, the emitted light thus comprises a modulated part associated with coded light comprising information sequences. The emitted light may also comprise an un-modulated part associated with an illumination contribution. Each light source 2 may be associated with a number of lighting settings, inter alia pertaining to the illumination contribution of the light source, such as color, color temperature and intensity of the emitted light. In general terms the illumination contribution of the light source may be defined as a time-averaged output of the light emitted by the light source 2. The light source 2 will be further described with reference to FIG. 2.

As noted above the at least one light source 2 may emit one or more information sequences via the visible light 6. Notably the information sequences may change over time. The lighting system 1 may further comprise other devices 10 arranged to control and/or provide information to the at least one light source 2.

Figure 2:
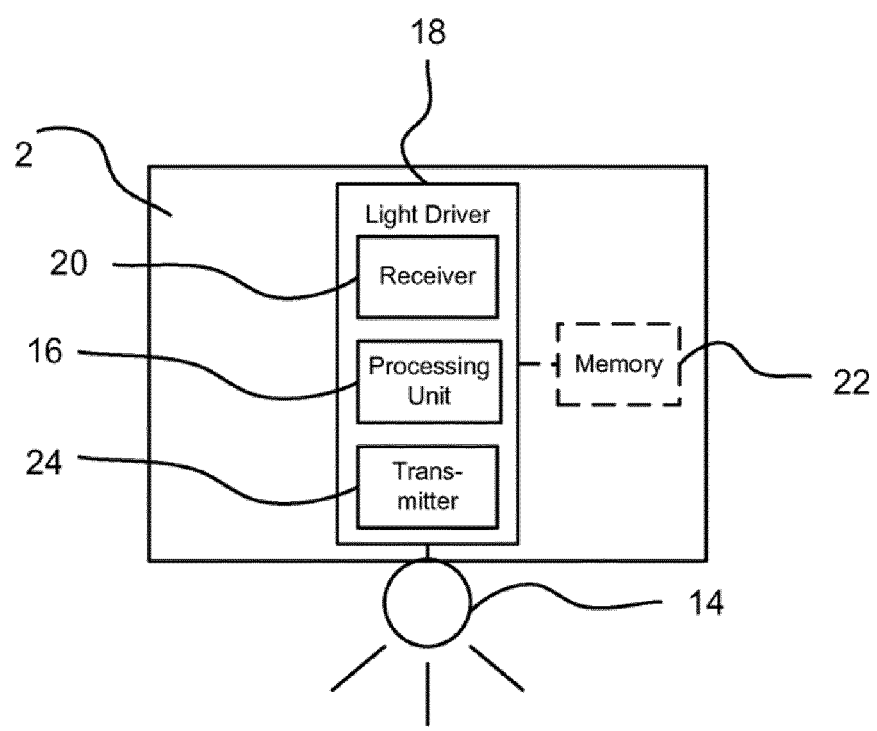
FIG. 2 illustrates a light source according of a coded light lighting system.

FIG. 2 schematically illustrates, in terms of a number of functional blocks, a light source 2. The light source 2 comprises an emitter 14 for emitting coded light. The emitter 14 may comprise one or more LEDs, but it could instead or in addition comprise one or more FL or HID light sources, etc. In general, the coding schemes may utilize multiple light sources. For example, a 3-level coding scheme may have two LEDs using the mappings (OFF, OFF) for the level "−A", (ON, OFF) for the level "0", and (ON, ON) for the level "+A".

The emitter is controlled by a light driver 18. The light driver 18 may comprise or be part of an information encoder 16, the information encoder can be realized using a processor such as a central processing unit (CPU).

As such the light driver 18 may comprise a receiver 20 and a modulator/transmitter 24. The receiver 20 may be arranged to receive settings, control information, code parameters and the like. The receiver 20 may be a receiver configured to receive coded light. The receiver 20 may comprise an infrared interface for receiving infrared light. Alternatively the receiver 20 may be a radio frequency (RF) receiver for receiving wirelessly transmitted information. Yet alternatively the receiver 20 may comprise a connector for receiving information transmitted by wire. The wire may be a power-line cable. The wire may be a computer cable. Information pertaining to settings, control information, code parameters and the like may be stored in the memory 22. The light driver 18 may receive information via the receiver 20 pertaining to an information sequence to be transmitted by means of coded light by the light source 2.

Although the coded light receiver 4 as depicted in FIG. 1 shows a light-sensitive diode, this need not be the case, over the last 15 years a wide variety of coded light systems have been conceived. Some of these systems make use dedicated sensors for receiving coded light, other systems make use of special cameras and further systems are designed to allow the use of low-cost rolling shutter cameras as may be found on laptops, tablets, smartphones and other consumer devices.

An example of a coded light system that uses visible light for both illumination and data transmission is provided in U.S. Pat. No. 6,198,230 B1 dating back to 1999. A more recent publication WO 2011086501 A1 discloses a different modulation method, wherein the data transmission is detected using a camera. WO 2012127439 A1 in turn describes a modulation technique wherein data is captured using a rolling shutter camera.

Locating the Portable Device

Before discussing the location of the portable device based on a camera image it is important to realize that coordinates in three-dimensional space are defined with reference to a frame. In order to combine information from the respective spaces it may be necessary to transform the coordinates from one frame to another frame. Quaternions represent a very efficient manner to transform coordinates from one frame to another frame.

Figure 3A:
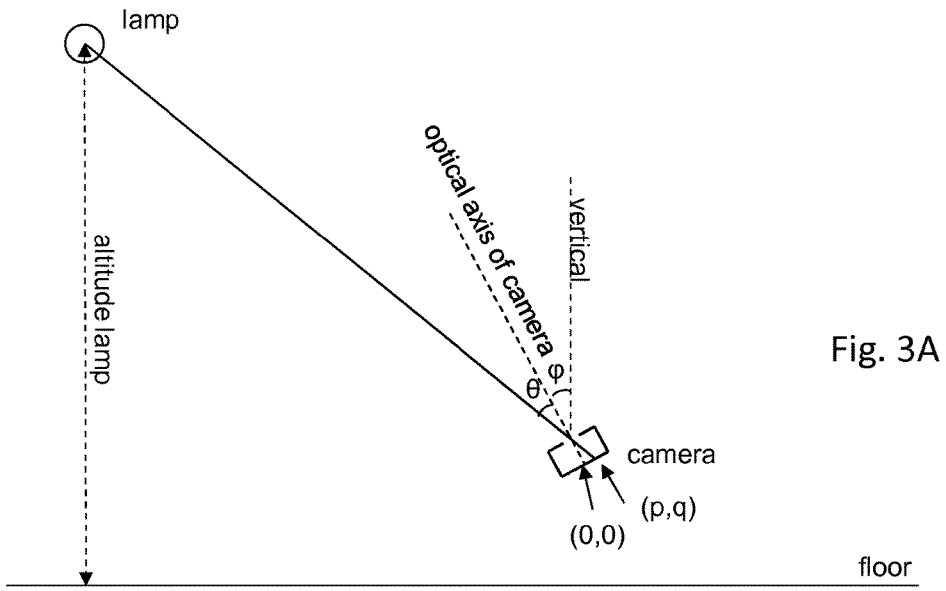
FIGS. 3A-3C illustrating the process of mapping image to position.
Figure 3B:
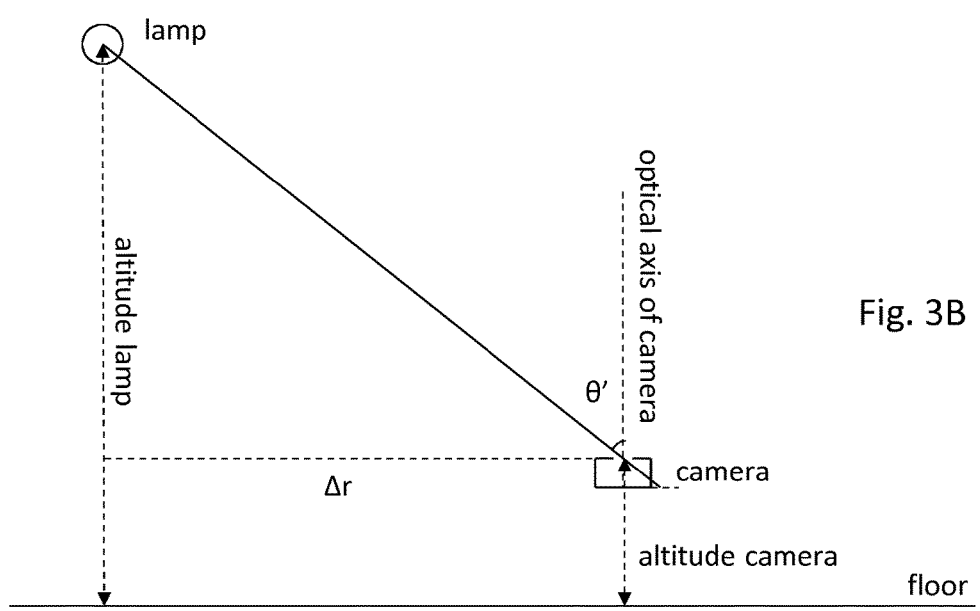
Figure 3C:
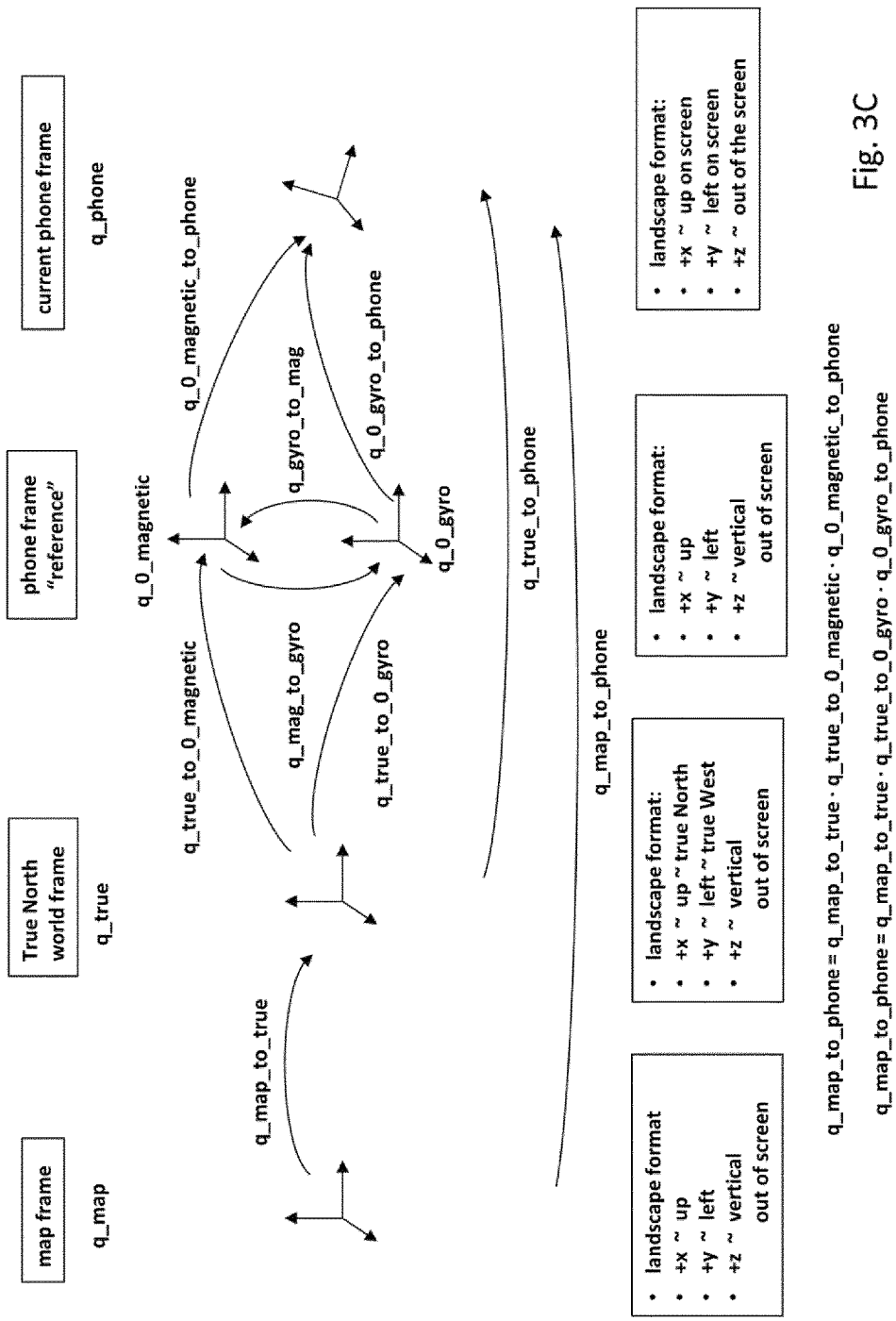

FIG. 3C shows four coordinate systems and illustrates how coordinates in the respective coordinate systems can be transformed. These transformations effectively allow the correlation of map information such as the spatial position of a luminaire in a building on the map of a building to the images as captured using the image sensor of the mobile device.

The map frame corresponds to the coordinate system of the map data, the "true north world frame" corresponds to coordinates in the world frame, with respect to a reference direction, here true north. The phone "reference" frame corresponds to the coordinate system at a "reference" instance, e.g. at time t=0. The current phone frame in turn corresponds to the coordinate system based on the current position and orientation of the phone.

As illustrated in FIG. 3C, it is possible to transform a coordinate from the map frame to the world frame by multiplication using the quaternion q_map_to_true.

FIG. 3C shows that it is possible to map coordinates from the map frame to the current phone frame by multiplying the map coordinates using the q_map_to_phone quaternion multiplication. Using this transformation the spatial position of a luminaire can be transformed to that of the current phone frame. This coordinate transformation in turn can be seen as the combination of a transform from the map frame to the (true north) world frame, from the world frame to the phone reference frame, and from the phone reference frame to the current phone frame.

In the above manner it is possible to correlate a spatial position of an object such as a luminaire captured by the phone with information such as a plurality of spatial positions of luminaires present in the map frame. Alternatively it is also possible to map spatial coordinates from the current phone frame to the map frame.

To illustrate how the present invention can be used we use a simplified example based on a pin-hole camera model and a simplified geometrical setup as shown in the FIGS. 3A and 3B.

FIG. 3A shows a side-view of a pinhole camera in a three-dimensional space. The camera model used here is a pinhole camera wherein light incident on the pin-hole is imaged on the camera back. The side-view corresponds with the plane through the vertical through the lamp and the pinhole of the camera. In general, the image consists of various pixels, wherein pixel (0,0) corresponds to the optical axis of the camera and the pixels corresponding to the light source corresponds with (p,q). In our simplified setup, we assume that the orientation of the camera is such that q=0. From the value of p, we can compute the tangent of $\theta$ and hence $\theta$ itself.

From the IMU of the portable device we obtain orientation information of the camera (i.e. phi in the simplified setup) that we can use to transform $\theta$ to the map frame. In our simplified setup, this corresponds to a rotation around an axis perpendicular to the plane of FIG. 3A, We compute θ'=θ+phi, so we arrive at the situation as shown in FIG. 3B.

From FIG. 3B, it is immediate that we can compute the horizontal distance Δr between the camera and the lamp by using elementary trigonometrics as Δr/(alt_lamp−alt_camera)=tan θ'.

In a similar manner we can also deal with other or more general camera rotations.

Included below is a short exemplary matlab code for transforming pixel coordinate of camera to meters in the map frame.

```
function [ lamp_coordinate_inertial_frame ] = camera_to_map(
lamp_coordinate_pixel,Rotor, . . .
    altitude_lamp,altitude_phone,tan_to_pixel_conversion )
% transforming pixel coordinates of camera to meters in map frame
%%%%%%%%%%%%%%%%%%%%%%%%%%%%%%%%%%%%%%%
%%%%%%%%%%%%%%%%%%%%%%%%%%%%%%%%%%%%%%%
%%%
%{
* quaternion Rotor describes the rotation from the map coordinates to the
    screen coordinates of the phone in the current phone orientation in
    space
    * x points up and y points left on the map
    * x points up and y points left on the (screen) map frame (z points
out
of the screen)
    (iphone standard frame for sensor platform)
* in order to go from current phone frame to the map frame, we have to
apply R*
* ==> frame transformation: R** q R*   = R q R*
* lamp_coordinate_pixel: (x,y) from center of image
* lamp_coordinate_inertial_frame: (x,y) in meters from current
phone position
%}
%%%%%%%%%%%%%%%%%%%%%%%%%%%%%%%%%%%%%%%
%%%%%%%%%%%%%%%%%%%%%%%%%%%%%%%%%%%%%%%
%%%
% going from pixels to tangens of angle in SmartPhone frame
lamp_coordinate_tan = lamp_coordinate_pixel/
tan_to_pixel_conversion;
% going to direction quaternion in phone frame (not a unit quaternion)
z = 1;
x = lamp_coordinate_tan(1);
y = lamp_coordinate_tan(2);
quat_phone_frame = [0; x; y; z];    % pure quaternion = vector
quat_map_frame = quatmul( Rotor, quatmul(quat_phone_frame,
quatconj(Rotor))); %
phone frame ==> map frame
% horizontal coordinates (x,y) of lamp in relative map coordinates
      % relative to currently assumed position of phone
      % where x points up and y points left on the map,
lamp_coordinate_inertial_frame = (altitude_lamp-
altitude_phone)*quat_map_frame(2:3)/quat_map_frame(4);
lamp_coordinate_inertial_frame = lamp_coordinate_inertial_frame';
% transpose:
create row vector
end
```

As demonstrated using the pin-hole camera example above it is possible to use the orientation information from an IMU of a portable device/camera, the position of the first light source in the image information as captured by the camera and an approximation of the height of the portable device (alt_camera) to determine the location of the portable device relative to the light source. When the location of the imaged light source is also known, e.g. because the light source emits its position, all information is available to approximate the location of the portable device.

It will be clear to those skilled in the art that accuracy of the computed location will be influenced by the accuracy of the orientation information and the accuracy of the height approximation.

Correction of Orientation

Figure 10A:
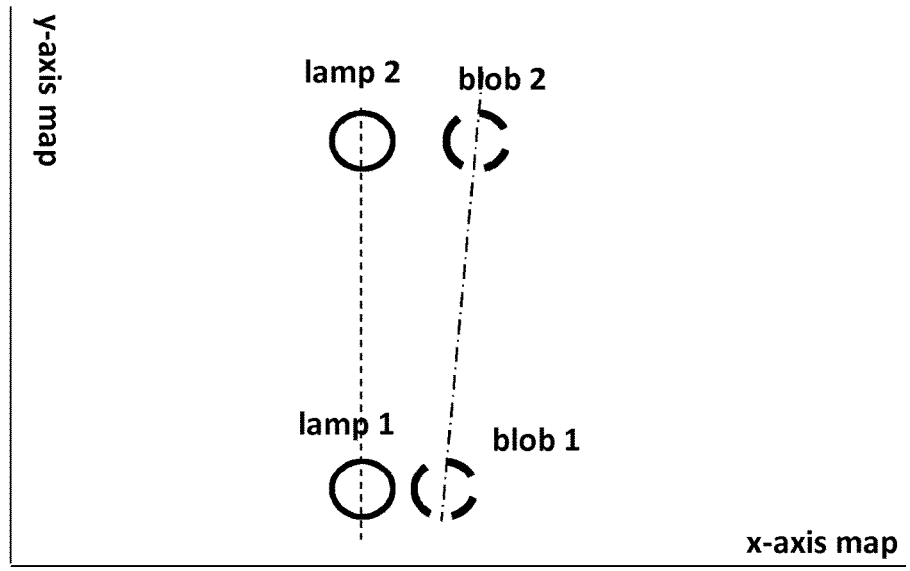
FIGS. 10A-10B illustrate the process of correcting an IMU error.
Figure 10B:
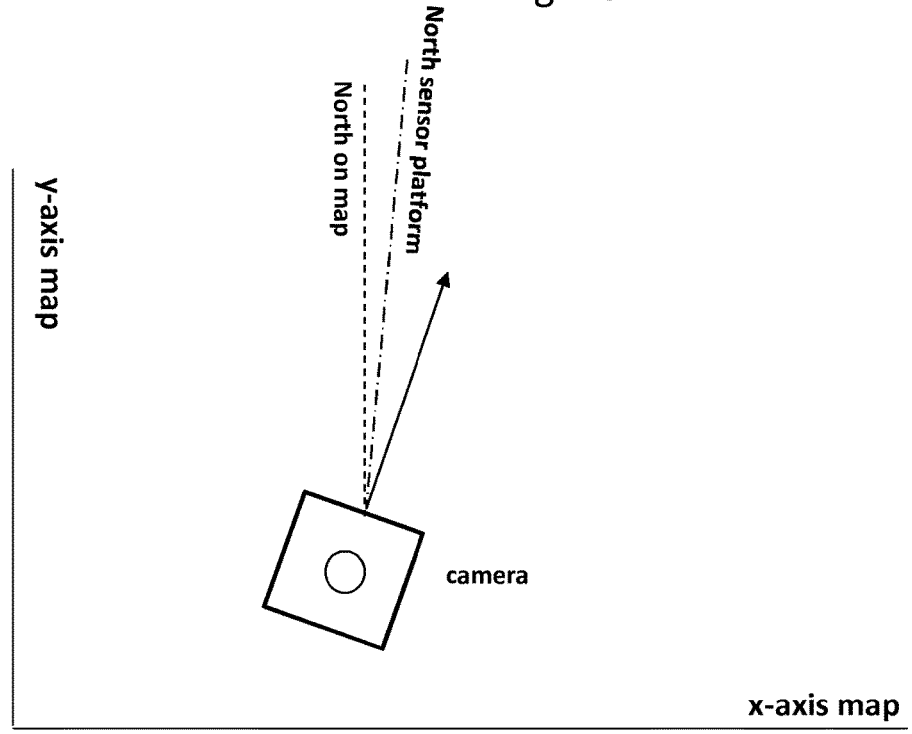

In practice it may occur that as a result from drift there is a difference between the North of the sensor platform and the North on the map as is indicated in FIG. 10B.

Such orientation errors may also be quantified or reduced when multiple coded-light light sources are images in a single image. In order to quantify this error we can calculate the theoretical locations of the light sources/lamps that are imaged by the image sensor, based on the current location and orientation based on the sensor platform. These theoretical location correspond with the (x,y) position of the lamps in the map frame, at the same height as the lamp we consider it to represent (i.e. typically at ceiling height).

As indicated in FIG. 10A such computation may provide us with two blobs; i.e. blob1 corresponding with lamp1 and blob2 corresponding with lamp2. The difference between the blob and corresponding lamp is an indication of the error in orientation. Using this information we can correct the error made by the sensor platform, more particularly from the angle between the blob-pair and the lamp-pair on the map, we can correct the heading of the inertial sensor platform, either at once or more gradually.

When the lamps and/or light sources in the lamps have an elongated shape or a shape that is indicative of the lamp or light source orientation, it may be beneficial to not only provide position information of the respective light sources, but also orientation information. For example in case of a tube light, the ends of the tube can be used to similar effect as the two discrete lamps shown in FIG. 10A.

As will be clear to those skilled in the art the orientation information of a light source can be encoded in different manners, e.g. in case of a tubular light source, the light source can be encoded in the building database using the 3D position of both end points. Alternatively the position of the center-of-gravity and orientation may be encoded, the center of gravity, orientation and length, or more alternatively the center-of-gravity and the light source shape outline. A position, such as that of the center-of-gravity, is most relevant. Further information such as shape and/or orientation may be added. For example, in the event of a tubular light source the center of gravity would correspond to the required position parameter, however when also encoding the orientation, the orientation of the light source may be used for correcting drift as described hereinabove.

Furthermore when the physical size of the light source is known, e.g. because it is encoded in the light source output, or can be retrieved based on the light source type information when that is encoded in the light source output, alternatively this information may be provided in a light source database linking light source identifiers to position and light source types. The light source footprint in the captured image may be used, in combination with the known orientation of the portable device, to approximate the distance to the light source (Δl).

In its simplest form the approximation of Δl could be based on the maximum diagonal of the light source footprint in the captured image or alternatively could be related to the number of pixels (i.e. the size of the footprint) in the captured image; e.g. consider the size of a downlighter in a ceiling image; i.e. the closer the light source, the larger the footprint. However for light sources with a more complex geometry the approximation may involve rendering a three-dimensional light source model and comparing the size of the image footprint with that of the rendered three-dimensional light source model. Given that we have calculated the distance Δr (see FIG. 3B), and we can approximate Δl (i.e. the distance between the lamp and camer), we can approximate the portable device/camera altitude using basic geometry. Subsequently the newly estimated portable device altitude/height may be used for calculating the portable device location.

Particle Filtering

Although it is possible to compute the location of a portable device based on the above approach, the quality of the resulting data is dependent on the accuracy of the orientation information as obtained from the inertial measurement unit and the success in establishing the proper light source. For example, after having read a code light ID from a downlighter, having located the position of the light source and having computed the relative position of the portable device versus the downlighter; the portable device position is known to be on a circle around the coded light ID. When reliable orientation data is available the position of the portable device is known; but even when inaccurate orientation data is available a more reliable indication may be provided using multiple measurements over time, the inventors have found that in particular when using low-cost IMUs, the results may be improved considerably through the implementation of a so-called particle filter.

In a preferred embodiment the computation of the location of the portable device further involves a particle filter. Particle filter theory was introduced around 1993 and since then has evolved considerably. A theoretical analysis of particle filtering is provided in "Particle Filter Theory and Practice with Positioning Applications", by Fredrik Gustafsson published in Aerospace and Electronic Systems Magazine, Vol. 25, Issue 7, here by incorporated by reference.

Particle filters effectively try to model different possible solutions (particles) to a complex problem and evaluate these solutions based on compliance with measured reality. In situations where there is no a priori knowledge of the solution the individual particles can be distributed randomly or evenly over the solution space.

On a regular basis, the set of particles may be evaluated by attributing weights to the respective particles based on their perceived match with reality. Next the particles are resampled; i.e. new particles are generated taking into account the passing of time, e.g. by taking into account acceleration data, and subsequently resampling of the particles based on their weights; that is the new particles are distributed over the solutions space based on the respective weights; i.e. there will be more new particles in proximity of old particles with a high weight/probability and there will be relatively fewer new particles in proximity of old particles with a low weight/probability. Instead of distributing the particles, the approach can be simplified by copying the particles.

When translated to the present invention, the particles that are maintained each reflect a possible state of the portable device; i.e. a possible orientation of the portable device and a possible location of the portable device. During the weighting phase of the particle filter the multiple particles are weighted by comparison of the respective particle state with the orientation information as obtained from the IMU and the location information as computed. In summary this corresponds to an evaluation of the data and the closer the match; i.e. the smaller the differences between the respective location and the respective orientation, the better the match and the higher the weight.

Subsequent to the weight generation the particles are resampled based on the weights as computed.

In order to consolidate both orientation and location the inventors propose to consolidate the particles into a single state value (i.e. orientation and location), by either averaging the weighted states of the old particles, or by averaging the state of the resampled particles.

Notably to remove outliers it may be possible to average over a subset of the particle states, taking into account a predetermined number of particles only. In the extreme case the subset may be a single element in which case a particle with the highest weight is selected.

By consolidating the orientation and location information from the particle filter over a large number of particles a much more robust and time-stable orientation and location can be obtained.

Figure 5:
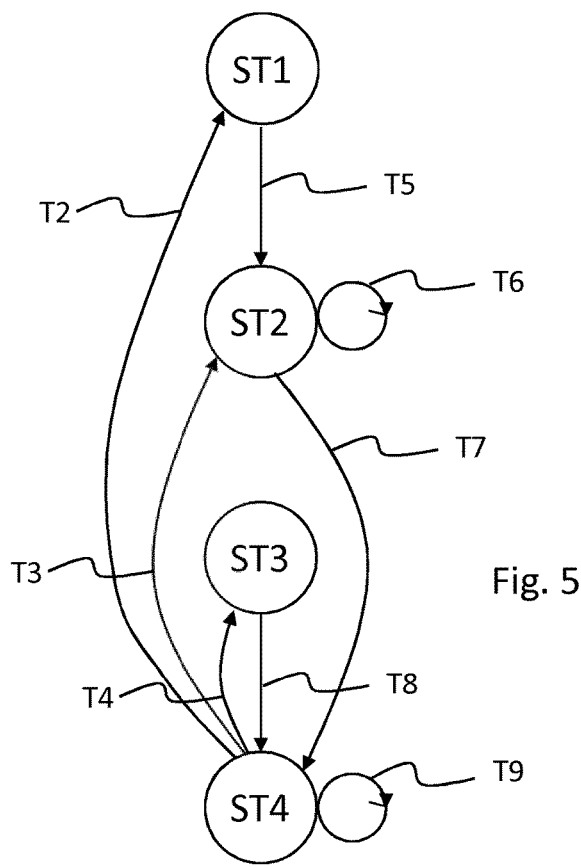
FIG. 5 shows a diagram depicting a state machine for controlling a particle filter in an embodiment of the present invention.

A particularly advantageous manner of computing a consolidated orientation and location of the portable device is possible using the state machine as shown in FIG. 5. The state machine in FIG. 5 describes the actions and events that are used to initialize and update the particle filter in a robust manner.

ST1 represent the initial state of the state machine at this stage there is "no confidence" in either the orientation and or location of the portable device. At the moment when a coded light identifier is detected and we thus know our current location we follow the transition T5 from ST1 to ST2, to the state of "position confidence", and we initialize a set of particles based on the initially calculated location of the portable device. Typically the particles correspond with a set of dots equidistant around the coded light source (unless we obtain more information e.g. in the form of multiple light sources in a single image). Every time we read a coded light identifier, we follow transition T6, we update the weights and resample the particles and we return to ST2.

If in the process the portable device is moved and we capture the coded light from a different angle then orientation confidence may increase. If a predetermined first confidence threshold is exceeded we follow transition T7 from ST2 to ST4, the state of "full confidence". As long as we are in state ST4 and we find an expected light source (coded or non-coded light) we follow transition T9, i.e. we update the weights and resample the particles, and optionally eliminate outliers (exceeding a certain distance threshold) and we return to ST4.

If at this stage the location confidence drops below a predetermined second confidence threshold, e.g. because we see a light source identifier that conflicts with the current particles then we follow transition T4 and move towards ST3, the state of "orientation confidence". From here we may follow T8 and return to ST4 again when we detect a coded light identifier that restores our location confidence. In the process we also initialize the particles. If in T4 the orientation confidence drops below a predetermined third threshold, we follow the transition T3 from ST4 to ST2.

Finally if in the state ST4, the location confidence drops below the predetermined second threshold and the orientation confidence drops below the predetermined third threshold we follow transition T2 that brings us to ST1.

Following the above approach the consolidated state; i.e. the consolidated orientation information and consolidated location of the portable device correspond to the average position and the average orientation of all particles after updating.

Correcting Orientation Information for Particle Filtering

Figure 4:
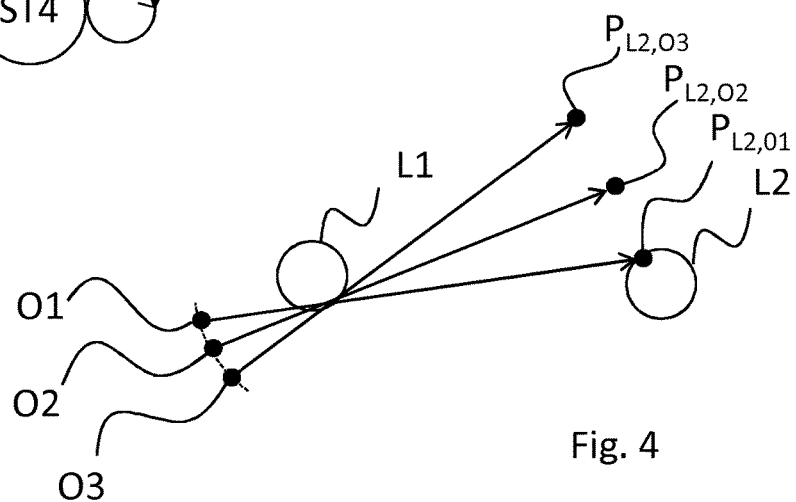
FIG. 4 shows a top-view view of an example of back-projection.

Further improvements to the locating process are possible by correlating information obtained from multiple light sources that are being imaged, in particular when two light sources with a known three-dimensional location are imaged in one and the same image. This will be further explained with reference to FIG. 4. FIG. 4 shows a top-view of a room having two coded light sources being L1 and L2. Next a person holding a portable device enters the room; the portable device detects coded light source L1 and based thereon a location and orientation is determined, having a certain inaccuracy. As a result we may have multiple high weight particles that could correspond to our current position, here visualized by O1, O2 and O3.

If at this stage we detect a second light source L2, also having a known position we can project the position of the center of gravity of the light source back onto the ceiling based on the above particles resulting in the three dots $P_{L2,O1}$, $P_{L2,O2}$ and $P_{L2,O3}$. As can be seen the projection of $P_{L2,O1}$ is closest to the known position of L2 and therefore the particle O1 appears to be the best candidate.

The mechanism as presented above can be used for weighting the particles in the particle approach.

Multi-Hypothesis Tracking

Multi-Hypothesis Tracking or MHT is an alternative for the particle filtering approach described hereinabove. MHT to this end uses hypotheses. In MHT we simultaneously keep track of a fixed number of M most promising hypotheses. In our application of indoor positioning, each hypothesis $H_i$ is characterized by certain assumptions such as current lamp used, current position on the map, current heading, etc. If a new image frame (image of the camera) arrives, each of the hypotheses is updated using the visual information of the camera frame and the orientation information of the inertial platform of the phone.

For each of the hypotheses, we compute a number of promising descendants (e.g., by considering neighboring lamps from the current lamp as candidates). For each of the descendants, a metric is computed, where the metric reflects the probability of the descendant being the true hypothesis. Finally, on the basis of their metrics, we select the best M descendants, called survivors, as the M most promising hypotheses for the next round.

Each hypothesis $H_i$ is characterized by a state vector SMHT(i), where SMHT(i) keeps track of important variables of $H_i$, such as:

current lamp index from which the current position is computed the phone coordinates on the map the metric of $H_i$ at the current time step various Kalman filter-related variables such as current position, speed and P-matrix and current heading correction (corresponding to the orientation in the horizontal plane)

A Kalman filter consists of a prediction stage and a measurement correction stage. In computing the states of each descendant, we first use the Kalman prediction stage for predicting new positions, velocities and heading corrections. The Kalman predictions (in particular, the predicted lamp positions using the current orientation quaternion) are then compared with the actual measured lamp positions by the image sensors and the known lamp positions on the map. From these comparisons, we can make the Kalman measurement corrections on positions, velocities and heading corrections for each descendant. Finally, from the differences between the predictions and the measurements, we derive for each descendant:

a metric related to the probability that the current descendant corresponds to the true hypotheses, a correction for the current heading that is used for correcting the drift of gyros, or for correcting a changing magnetic deviation.

As mentioned above, we select the M best (metric-wise) survivors of the descendants as hypotheses for the next round.

When the location of the portable device and/or image sensor has been determined this information may be used to provide the user of the portable device with visual feedback. Before proceeding with various types of visual feedback we will first discuss the structural aspects of the portable device and or a system comprising a portable device in accordance with the present invention.

With reference to FIG. 6A, this figure shows a front view of an example portable device 100 according to the present invention. The portable device comprises a display 120 for providing feedback to the device user and a front-facing image sensor 110.

FIG. 6B shows a block diagram of portable device 100. Portable device 100 comprises an image sensor 110, an IMU 150 and a first processing unit 140. The device further comprises a memory 130 connected to the first processing unit. The first processing unit is arranged to obtain an image from the image sensor which may be transferred over bus 105. In application the image sensor (or camera) can be used to image light sources, for enabling the localization of the portable device, for example by imaging ceiling mounted light sources.

The portable device further comprises an IMU 150 arranged to communicate orientation information of the portable device over the bus 125 to the first processing unit 140. When used for localization purposes the orientation information should be captured substantially simultaneously with the image from the image sensor. As there are physical limitations associated with normal use of a portable device for navigation substantially simultaneously need not be construed as being within the microsecond range. Preferably simultaneously here refers to within 0.5 seconds of one another, or more preferably within 0.1 seconds of one another. In this manner the error introduced as a result from motion remains within bounds.

The portable device further is arranged to acquire light source specific information from coded light from a coded light receiver. Notably this information may be acquired prior to, simultaneously with or subsequent to the image acquired by the image sensor. Advantageously the modulation used for transmitting the light source specific information is such that it can be detected by the image sensor. Alternatively the coded light may be detected using a dedicated light sensitive sensor (not shown).

The first processing unit 140 is further arranged to compute the location of the portable device or image sensor based on the orientation information, a predetermined height estimate of the portable device or image sensor, the location of the light source in the image and the light source specific information.

Once the location of the portable device has been computed, the portable device may present the user of the portable devices with an image on the display 120, indicating the location of the portable device with respect to e.g. the respective light sources and/or further features. In order to be able to render such image, the portable device may comprise map information within memory 130 which can be used to graphically visualize a map on the display and which may be supplemented by a visual indication corresponding to the portable device at the computed position of the portable device.

The portable device 100 advantageously is a smart phone or a tablet that is suitably configured for computation of the location of the portable device. In the event that the location is to be detected using the standard smart phone or table hardware the coded light needs to be chosen to be compatible with the respective hardware features. An exemplary modulation type that aims to accomplish this is e.g. described in the not yet published EP patent application 14155278.6, hereby incorporated by reference.

When the abovementioned modulation is used a conventional tablet may be used configured to receive the coded light using a downloadable application, also known as "App". To this end the portable device is preferably provided with a wireless transceiver 180, which may be a 802.11, a 802.15.4, a Zigbee, a GPRS, UMTS, or LTE transceiver for connecting to a network 170 using a wireless link 145, such as the internet, and may download the App from an application store 190.

Referring to FIG. 7, FIG. 7 shows a block diagram of an example system according to the present invention. The depicted system comprises a portable device 100, but in this case the actual calculation of the portable device location is conducted by a host device 200. The depicted system 290 is arranged for localization of the portable device 100 based on coded light, the system 290 comprises: a plurality of light sources wherein at least one of the plurality of light sources is arranged to transmit light source specific information using coded light. Here for the sake of simplicity only a single coded light source 2 is depicted. The system 290 further comprises a portable device 100 comprising an image sensor 110, an IMU 150 and a first processing unit 140. The device further comprises a memory 130 connected by a memory bus to the first processing unit 140, the device further comprises a wireless transceiver 180 for communicating with a host device 200.

The host device 200 in turn also comprises a wireless communication unit 210 for communicating with the portable device. The devices connect over network 170, which may be a wireless or a hybrid partially wireless, partially wired network. The host device further comprises a second computing unit 220 which is connected by a bus 225 to storage unit 230.

The system 290 is arranged to obtain an image from the image sensor 110 and to obtain orientation information from the IMU 150 substantially simultaneously with the image from the image sensor. The portable device 100 subsequently shares this information with the host device 200 over the wireless connection. Likewise the portable device 100 obtains light source specific information from a coded light receiver; either in the form of the image sensor or by means of a dedicated sensor. Again this information is communicated to the host device 200, thereby allowing the second processing unit 220 of the host device to compute the location of the portable device 100 based on the orientation information, a predetermined height estimate of the portable device or image sensor, the location of the light source in the image and the light source specific information.

It is noted that when the relation between the orientation of the portable device 100 and the image sensor 110 is fixed and known, as is customary with a rigidly mounted image sensor on e.g. mobile phones, then the orientation of the portable device can be quite easily transformed into the orientation of the image sensor.

Once the orientation and location of the portable device are known this information may be used to provide visual feedback to a user of the portable device. FIG. 8A shows an example image as displayed by an Application that uses the present invention for providing the user of the portable device with visual feedback as to her/his position with respect to map information of an indoor venue. The image shows an exemplary image of a top-down view of part of a room having mounted therein 1 coded light source and 2 conventional light sources. Also in the image are two pieces of furniture in the form of a fixed mounted chair 310 and a fixed mounted table 320. Further the image also shows two ceiling mounted lights indicated by the circle with an "L" and one coded light indicated by the circle with a "C".

In the image shown the location of the portable device is visualized by a circle marked with a "U". Furthermore there is a dotted line 330 around the coded light highlighting the light source that was used for computing the current position. Notably alternatives are possible, e.g. in the form of a visual indicator in the form of the circle color. Notably the color of the circle may further be used to indicate to the user whether or not the light source is currently being imaged by the image sensor; e.g. a bright green color may indicate that the coded light is currently being imaged, whereas a greyish color may indicate that the light is no longer being imaged.

FIG. 8B further shows a further image of an implementation wherein the image on the display is rotated such that if the display is held substantially horizontal and the calculated orientation of the portable device or image sensor is correct then the orientation of the map on the display aligns with the physical world. This is particularly advantageous because it allows a user to walk with the portable device in hand and facilitates the localization of a coded light source or other light source that may be used for navigational purposes.

FIG. 8C shows a further image of an implementation wherein the a visual indicator is provided for indicating a reliability of the established position. In the image shown, the reliability is lower than in the image of FIG. 8B, this is visualized, by breaking up the circle and increasing the circle diameter in order to visualize the decreased reliability. Notably the size of the circle may be chosen to coincide with the position of several particles/hypotheses, in the event particle filtering/multi-hypothesis tracking is being used. Notably instead of breaking up the circle, alternatives exist e.g. by gradually fading the color of the position indicator to the background color with decreasing confidence.

Figure 8D:
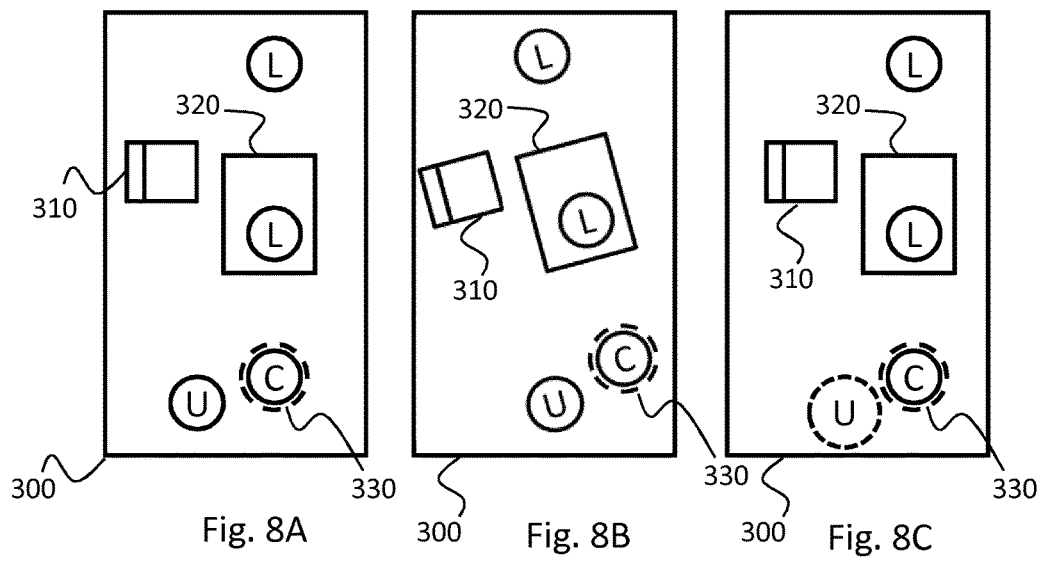
Figure 8D:
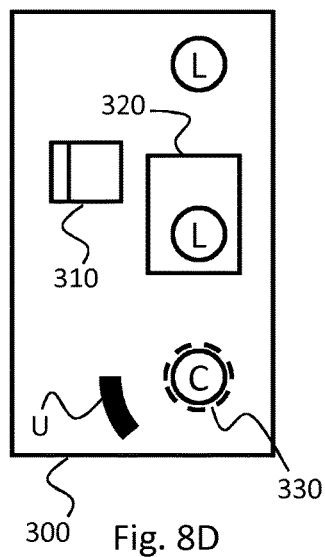

FIG. 8D shows a further image in which the shape of the position indicator is no longer a circle, but instead and circle segment is used that coincides with likely alternative positions that result from estimated in-accuracy of the orientation information.

Figure 9A:
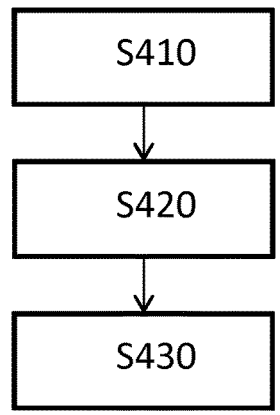
FIGS. 9A-9C show flow-charts of a methods of locating a portable device.

FIG. 9A shows a flowchart of a method according to the present invention of locating a location of a portable device using coded light. The method comprises a step S410 for obtaining an image comprising the coded light source from the image sensor and substantially simultaneously obtaining orientation information indicative of the orientation of the portable device or the image sensor from an IMU. This is followed by a set S420 for obtaining light source specific information in the form of either an identifier that allows retrieval of a three-dimensional location of the coded light source or a three-dimensional location of the coded light source. The final step S430 relates to the computation of the location of the portable device or image sensor based on the orientation information, a predetermined height estimate of the portable device or image sensor and the light source specific information.

Figure 9B:
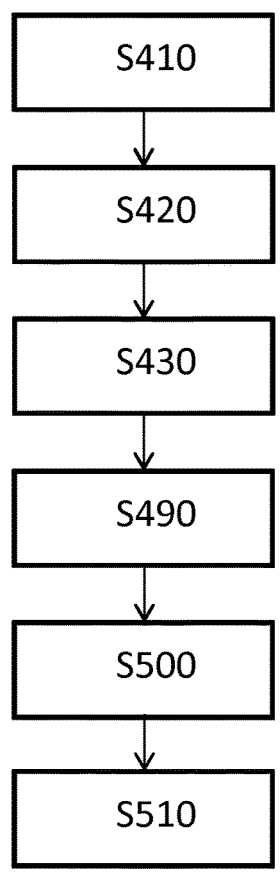

FIG. 9B shows a flowchart of a further method according to the present invention of locating a location of a portable device using coded light. The method starts of using the steps S410, S420 and S430 as described herein above with reference to FIG. 9A. the subsequent steps of the depicted method address are used for corrective actions which become feasible when multiple light sources are found in a single image, wherein the location of the multiple light sources is known. As a result the fourth step S490 of the flowchart comprises the detection of multiple light sources in a third image from the image sensor, wherein the multiple light sources are comprised in the first or second map information. The step S500 comprises computing candidate locations of the portable device or image sensor based on the location of the multiple light sources, as both light sources are visible in one image, and the three-dimensional location of both light sources are known, it is possible to determine the location of the portable device and thereby correct one of: the predetermined height estimate or the orientation information, for example for compass deviation and/or gyroscope drift.

Figure 9C:
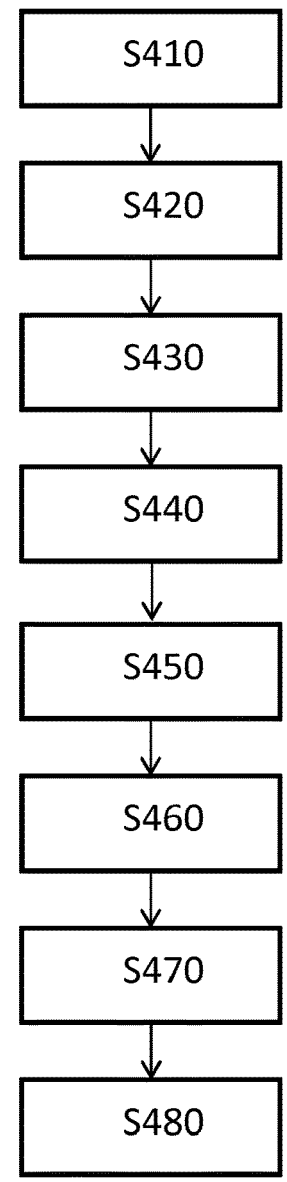

FIG. 9C shows a flowchart of a further method according to the present invention of locating a location of a portable device using coded light, wherein initially a coded light source is detected, in line with FIG. 9A hereinabove and wherein subsequently portable device localization is continued using a non-coded light source.

To this end the method includes a fourth step S440 for obtaining heading information indicative of motion of the portable device in a heading direction, a fifth step S450 for obtaining a second image comprising a light source that does not transmit coded light. Which step is followed by a further step S460 of accessing second map information comprising three dimensional location data, providing further three-dimensional locations of light sources, and step S460 of establishing a candidate light source comprised in the second map information based on a computed location of the portable device or image sensor and the heading information, and step S470 for computing an updated location of the portable device or image sensor under the assumption that the light source in the second image corresponds with the candidate light source, using:

the orientation information,
the location of the candidate light source in the second image,
the predetermined height estimate of the portable device or image sensor, and
the location of the candidate light source identified by the second map information.

Notably further advantageous embodiments of methods in accordance with the present invention are described in the claims.

It will be clear to those skilled in the art that the processing unit as presented herein above, may be realized in a variety of manners. Such processing units may be implemented using a single Application Specific Integrated Circuit (ASIC) or multiple ASICs, or using a programmable platform comprising one or more digital signal processors, and or accelerators or even general purpose processors. Furthermore although not necessarily explicitly mentioned, such devices may comprise integrated memory and/or may make use of external memory. In particular when programmable hardware is used the method steps performed by the processing unit may be realized partially in software and partially in hardware.

In the description above, the inventive concept is described with reference to, but should not be limited to, the application of (low-cost) cameras for the detection of coded light sources. Although most examples explicitly refer to camera based implementations, it is further noted that other sensors sensitive to light variations are also envisaged.

Above, embodiments of the light detection system according to the present invention as defined in the appended claims have been described. These should be seen as merely non-limiting examples. As understood by a skilled person, many modifications and alternative embodiments are possible within the scope of the invention.

It is to be noted, that for the purposes of this application, and in particular with regard to the appended claims, the word "comprising" does not exclude other elements or steps, that the word "a" or "an", does not exclude a plurality, which per se will be apparent to a person skilled in the art.

The invention claimed is:

1. Method of locating a location of a portable device using a first light source, the portable device comprising an image sensor and an inertial measurement unit, the method comprising:

obtaining a first image comprising a first light source from the image sensor and substantially simultaneously obtaining orientation information indicative of the orientation of the portable device or the image sensor from the inertial measurement unit;

establishing a three-dimensional location of the first light source;

computing the location of the portable device or image sensor based on the orientation information, the position of the first light source in the first image, a predetermined height estimate of the portable device or image sensor and the three-dimensional location of the first light source, and subsequently continuing localization of the portable device by using detection in a second image of a second light source that does not emit light which denotes information, in combination with the location computed based on the position of the first light source in the first image, and with subsequent information from the inertial measurement unit, to compute an update to the location of the portable device.

2. The method of claim 1, wherein the first light source is a coded light source, and wherein establishing the three-dimensional location of the first light source comprises:

obtaining light source specific information from the coded light from the first light source in the form of:

an identifier that allows retrieval of a three-dimensional location of the coded light source or a three-dimensional location of the coded light source.

3. The method of claim 2, wherein the light source specific information is an identifier that enables retrieval of the three-dimensional location of the first light source, and wherein the computing comprises:

accessing first map information comprising three dimensional location data, relating light source specific information of one or more coded light sources to respective one or more locations, computing one or more candidate locations of the portable device or image sensor based on:

the orientation information, the position of the first light source in the first image, a predetermined height estimate of the portable device or image sensor, the location of the light source in the first image, and the location of the first light source identified by the light source specific information comprised in the first map information.

4. The method of claim 2, wherein the light source specific information comprises a three dimensional location of the first light source, and wherein the computing comprises:

computing one or more candidate locations of the portable
device based on:
the orientation information,
the position of the first light source in the first image,
a predetermined height estimate of the portable device or image sensor, and
the three-dimensional location of the first light source comprised in the light source specific information.

5. The method of claim 1, wherein the orientation information is based on multiple modalities, the modalities including:
magnetic compass data,
three-dimensional accelerometer data, and
three-dimensional gyroscope data
and wherein the contribution of the respective sources can be weighted based on one or more control criteria.

6. The method of claim 1, the method further comprising
obtaining heading information indicative of the orientation of the portable device in the horizontal plane,
accessing second map information comprising three dimensional location data, providing further three-dimensional locations of light sources,
establishing a candidate light source comprised in the second map information based on a computed location of the portable device or image sensor, the position of the second light source in the second image, and the heading information, and
computing an updated location of the portable device or image sensor under the assumption that the light source in the second, image corresponds with the candidate light source, using:
the orientation information,
the position of the second light source in the second image,
the location of the candidate light source in the second image,
the predetermined height estimate of the portable device or image sensor, and
the location of the candidate light source identified by the second map information.

7. The method of claim 1, wherein the location and orientation are determined using a particle filter, and wherein multiple particles are maintained each particle reflecting a different possible state of the portable device, each state comprising a possible orientation and a possible location of the portable device and wherein the method involves:
for each particle determining a weight for the particle by matching the orientation and location of the respective particle with the obtained orientation information and the computed location, wherein the weight is higher when the match is better;
resampling the particles, by generating new particles based on the weights, wherein a larger number of new particles are chosen in proximity of particles with a higher weight, and
computing a consolidated location and orientation of the portable device or image sensor by averaging over the weighted particles, or over the resampled particles.

8. The method of claim 1, wherein multiple hypotheses are maintained each hypothesis reflecting a different possible state of the portable device, each state comprising a possible orientation and a possible location of the portable device and wherein the method involves:
for each hypothesis determining a metric for a hypothesis by matching the orientation and location of the respective hypothesis with the obtained orientation information and the computed location, wherein the metric is lower when the match is better;
branching each hypothesis into likely descendants, computing the metric for each descendant and retaining a pre-determined number of survivors for the next iteration; and
computing a consolidated location of the portable device or image sensor by picking the best hypothesis based on the respective metric.

9. The method of claim 1, further comprises:
detecting multiple light sources in a third image from the image sensor, wherein the multiple light sources are comprised in the first or second map information,
computing candidate locations of the portable device or image sensor based on the respective locations of the multiple light sources and
correcting at least one of:
the predetermined height estimate and/or
the orientation information.

10. The method of claim 1, further comprising presenting a visual indicator corresponding with the computed location of the portable device or image sensor by:
presenting a two-dimensional map of the vicinity of the portable device on a display of the portable device, and
providing a visual indicator corresponding with the computed location.

11. The method of claim 1, wherein the establishing of the three-dimensional location of the first light source comprises having a user indicate which specific light is being imaged on a map and subsequently retrieving its three-dimensional location from a database.

12. Computer program product stored on a computer-readable non-transitory and/or microprocessor-executable non-transitory medium, said product comprising program code instructions that, when executed by a processor, causes the processor to implement the method according to claim 1.

13. A portable device arranged for locating its location using a first light source, the portable device comprising:
an image sensor,
an inertial measurement unit,
a first processing unit,
the first processing unit arranged to:
obtain a first image from the image sensor,
obtain orientation information from the inertial measurement unit substantially simultaneously with the first image from the image sensor;
establish a three-dimensional location of the first light source, when the first image comprises the first light source;
compute the location of the portable device or image sensor based on the orientation information, the position of the first light source in the first image, a predetermined height estimate of the portable device or image sensor and the three-dimensional location of the first light source, and
subsequently continue localization of the portable device by using detection in a second image of a second light source that does not emit light which denotes information, in combination with the location computed based on the position of the first light source in the first image, and with subsequent information from the inertial measurement unit, to compute an update to the location of the portable device.

14. The portable device of claim 13, wherein the first processing unit is further arranged to establish said three-dimensional location of a first light source by having a user indicate which specific light is being imaged on a map and subsequently retrieving its three-dimensional location from a database.

15. A system arranged for localization using a first light source, the system comprising:
- a plurality of light sources comprising the first light source,
- a portable device comprising:
  - an image sensor,
  - an inertial measurement unit,
  - a wireless transceiver, and
  - a first computing unit,
- a host device comprising:
  - a wireless transceiver, and
  - a second computing unit, the system arranged to:
- obtain a first image from the image sensor,
- obtain orientation information from the inertial measurement unit substantially simultaneously with the first image from the image sensor;
- establish a three-dimensional location of the first light source, when the first image comprises the first light source;
- compute the location of the portable device or image sensor based on the orientation information, the position of the first light source in the first image, a predetermined height estimate of the portable device or image sensor and the three-dimensional location of the first light source, and
- subsequently continuing localization of the portable device by using detection in a second image of a second light source that does not emit light which denotes information, in combination with the location computed based on the position of the first light source in the first image, and with subsequent information from the inertial measurement unit, to compute an update to the location of the portable device.

* * * * *